(12) United States Patent
Sullivan et al.

(10) Patent No.: US 12,212,722 B2
(45) Date of Patent: Jan. 28, 2025

(54) DOCUMENT IMAGING APPARATUS WITH LEADING EDGE ENGAGEMENT FOR IMPROVED PERFORMANCE

(71) Applicant: OPEX Corporation, Moorestown, NJ (US)

(72) Inventors: Michael Sullivan, Moorestown, NJ (US); Kerry O'Mara, Moorestown, NJ (US); John Allen, Moorestown, NJ (US); James Walsh, Moorestown, NJ (US); Dobromir Kamburov, Moorestown, NJ (US); Michael Sparango, Moorestown, NJ (US); David Helmlinger, Moorestown, NJ (US); Peter Patrick, Moorestown, NJ (US)

(73) Assignee: OPEX Corporation, Moorestown, NJ (US)

( * ) Notice: Subject to any disclaimer, the term of this patent is extended or adjusted under 35 U.S.C. 154(b) by 0 days.

(21) Appl. No.: 18/466,078

(22) Filed: Sep. 13, 2023

(65) Prior Publication Data

US 2024/0333851 A1   Oct. 3, 2024

Related U.S. Application Data

(63) Continuation of application No. 18/129,063, filed on Mar. 30, 2023, now Pat. No. 11,985,280.
(Continued)

(51) Int. Cl.
*B65G 59/00* (2006.01)
*H04N 1/00* (2006.01)

(52) U.S. Cl.
CPC ....... *H04N 1/00641* (2013.01); *H04N 1/0032* (2013.01); *H04N 1/00588* (2013.01); *H04N 1/00602* (2013.01); *H04N 1/00652* (2013.01); *H04N 1/00745* (2013.01); *H04N 1/00779* (2013.01)

(58) Field of Classification Search
None
See application file for complete search history.

(56) References Cited

U.S. PATENT DOCUMENTS

| D574,881 S | 8/2008 | Forbes |
| 7,537,203 B2 | 5/2009 | DeWitt |
| (Continued) | | |

OTHER PUBLICATIONS

International Search Report issued for International Patent Application PCT/US23/17006 on Jun. 16, 2023.
(Continued)

*Primary Examiner* — Andrew H Lam
(74) *Attorney, Agent, or Firm* — Brian Dinicola

(57) ABSTRACT

A method and apparatus for processing documents is provided. The documents may be conveyed to a feeder for feeding documents to a scanner. The scanner scans each document to obtain image data and then discharges the document to one or more output or sort locations. The system may include a skew reduction assembly for reducing skew in the documents as the documents are fed to the scanner. The system may also include elements for improving image quality and reducing document damage while the document is scanned. The system may further include features for improving the stacking of the discharged documents.

18 Claims, 14 Drawing Sheets

Related U.S. Application Data

(60) Provisional application No. 63/325,605, filed on Mar. 30, 2022.

(56) References Cited

U.S. PATENT DOCUMENTS

| | | |
|---|---|---|
| 7,706,914 B2 | 4/2010 | DeWitt |
| 7,916,892 B2 | 3/2011 | DeWitt |
| 7,992,853 B2 | 8/2011 | DeWitt |
| 8,157,254 B2 | 4/2012 | DeWitt |
| 8,459,632 B2 | 6/2013 | DeWitt |
| 9,621,758 B2 | 4/2017 | O'Mara |
| 9,932,184 B2 | 4/2018 | Helmlinger |
| 10,757,274 B2 | 8/2020 | Montgomery |
| 10,855,864 B2 | 12/2020 | Sullivan |
| 10,906,761 B2 | 2/2021 | Helmlinger |
| 2003/0052444 A1 | 3/2003 | Luebben et al. |
| 2010/0102501 A1 | 4/2010 | Mandel |
| 2012/0063876 A1* | 3/2012 | Yap ................. B65H 1/025 414/795.4 |
| 2014/0199109 A1 | 7/2014 | Hurwich et al. |
| 2015/0210474 A1 | 7/2015 | Saastamo et al. |
| 2018/0295256 A1 | 10/2018 | Yasaki |
| 2018/0327204 A1* | 11/2018 | Helmlinger ............ B65H 5/025 |
| 2021/0044711 A1 | 2/2021 | Sullivan |
| 2021/0188577 A1 | 6/2021 | Helmlinger |
| 2022/0219203 A1 | 7/2022 | Walsh |
| 2023/0040699 A1 | 2/2023 | Sullivan |

OTHER PUBLICATIONS

Written Opinion issued in International Patent Application PCT/US23/17006 on Jun. 16, 2023.

\* cited by examiner

DOCUMENT IMAGING APPARATUS WITH LEADING EDGE ENGAGEMENT FOR IMPROVED PERFORMANCE

REFERENCE TO RELATED APPLICATIONS

The present application claims priority to U.S. patent application Ser. No. 18/129,063 filed on Mar. 30, 2023, which claims priority to U.S. Provisional Application No. 63/325,605 filed Mar. 30, 2022, which is hereby incorporated herein by reference. This application is also related to U.S. application Ser. No. 18/129,063 filed on Mar. 30, 2023, which is incorporated herein by reference.

FIELD OF INVENTION

The present invention relates to the field of document processing. The present invention finds particular application to the field of document imaging in which documents are to be fed to an imaging system, such as a document scanner.

BACKGROUND

Automated and semi-automated machines have been employed for processing documents. There have been numerous improvements in the field of document processing, including scanning and sorting documents, such as incoming mail. However, there remains a desire to improve the handling and processing of documents.

SUMMARY OF THE INVENTION

The present system provides a number of improvements in the fields of document processing, including separate inventions in document handling and document scanning. Although each of these improvements are combined into a single system, each of the improvements may be used as a separate invention in a document processing system.

For instance, according to a first aspect, a system is provided having a scanner for scanning documents, such as incoming envelopes, to obtain image data for the scanned documents.

According to another aspect, the system provides a system for processing documents that includes a conveyor for receiving documents, a plurality of output locations configured to receive documents from the conveyor and a sorter for sorting documents to the output locations. Optionally, the conveyor may be configured to convey documents along a document path without entraining the documents.

According to a further aspect, the system provides an apparatus for processing documents that includes a scanner, a conveyor, a feeder for feeding documents from the conveyor to the scanner, and a means for reducing skew of the feeder to impede rotation of the documents around a vertical axis as the feeder feeds the documents. Optionally, means for reducing skew may be positioned upstream from the feeder. Additionally, wherein the feeder may be configured to provide a net forward force on a first side of the document at a point laterally space from a centerline of the document and the means for reducing skew may provide a drag force on the first side of the document in a direction opposite the net forward force and spaced apart from the centerline of the document.

According to another aspect, the system may provide a method for processing documents that includes the step of feeding a document along a document path in a first direction by applying a feeding force to a leading portion of the document at a location spaced from a centerline of the width of the document so that the feeding force tends to create a torque in a first direction and the step of applying an anti-skew force to a trailing portion of the document while the feeding force is applied to the leading portion of the document, wherein the anti-skew force is opposite the direction of the feeding force and is applied at a location spaced apart from the centerline of the document.

According to an additional aspect, the present system provides an apparatus for processing documents that includes means for feeding a plurality of documents toward a document transport and means for sorting documents into one or more output bins. The means for sorting may include a document transport configured to convey the documents at a first speed and a discharge transport configured to convey the documents away from the document transport and toward a first bin of the one or more output bins and to selectively increase the speed of the documents to a second speed and then decrease the speed of the documents to a third speed that is lower than the first or second speeds.

According to yet another aspect, the system may provide a method for processing documents that includes the steps of feeding a plurality of documents one at a time toward a document transport and sorting the documents into one or more output bins. The step of sorting the documents may include the steps of varying the document speed as the document is discharged. For instance, the document may be sped up prior to being discharged. Additionally, after being sped up, the document may then be slowed down prior to discharge.

While the methods and apparatus are described herein by way of example for several embodiments and illustrative drawings, those skilled in the art will recognize that the inventive methods and apparatus for scanning and processing documents are not limited to the embodiments or drawings described. It should be understood that the drawings and detailed description thereto are not intended to limit embodiments to the particular form disclosed. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Some portions of the detailed description which follow are presented in terms of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
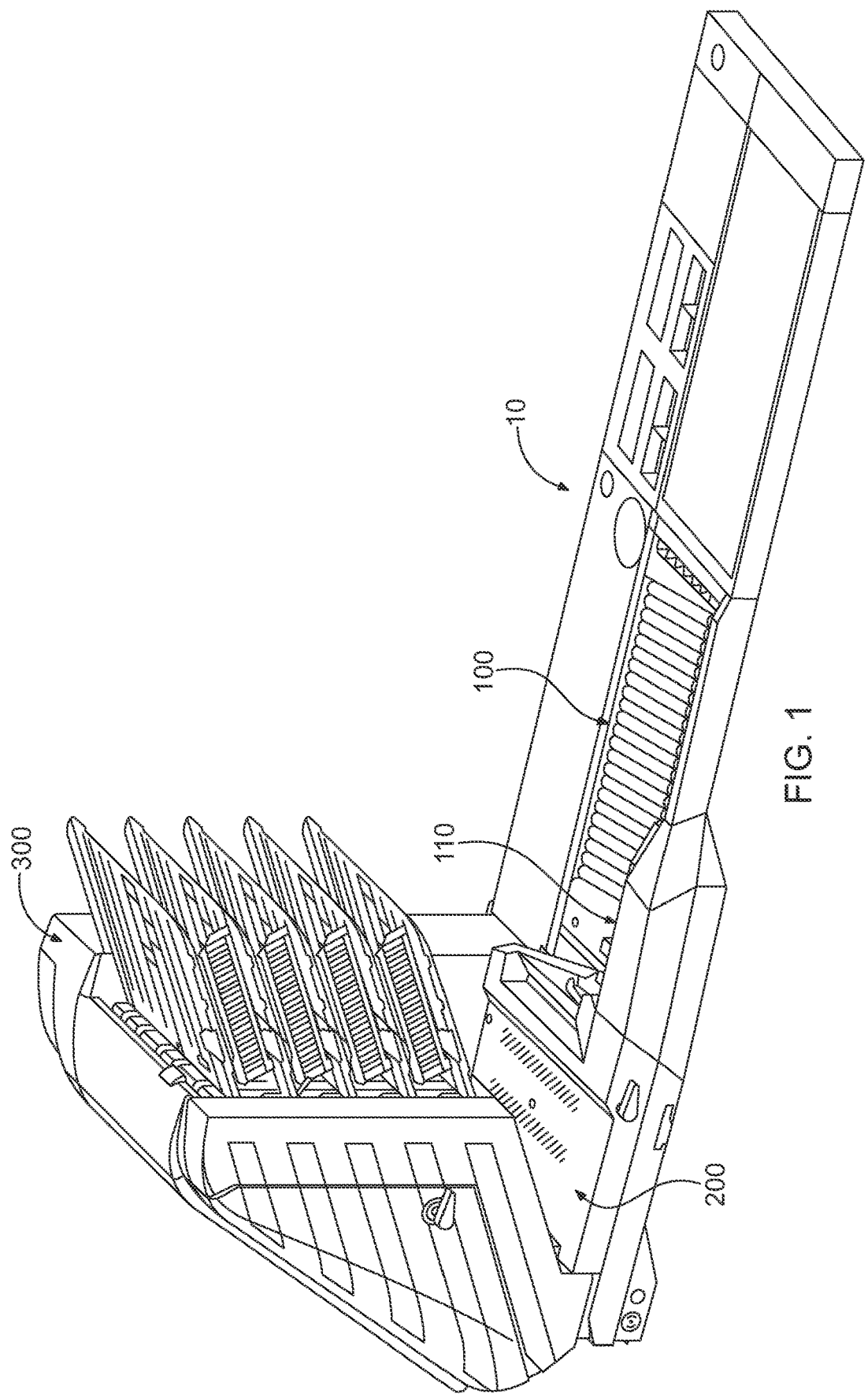
FIG. 1 is a perspective view of a system for processing documents.

Referring now to the figures in general and to FIG. 1 in particular, a document scanning workstation 10 is illustrated. The workstation 10 processes documents by dropping the documents individually or in stacks onto a conveyor that conveys the documents to an imaging station. The imaging station separates the documents, serially feeding the documents to an imager that obtains image data for the documents. The documents are then sorted into one or more output bins.

The present has particular application to workstations directed to processing documents and has particular application to processing packets of documents to scan the documents to obtain image data. In an exemplary embodiment, the workstation is configured as a semi-automated system for processing documents of a variety of types, including documents of varying size as well as folded documents, such as documents extracted from envelopes. The system may be incorporated into a larger system that includes elements such as a cutting station for cutting open envelopes and an extraction station for opening the envelopes to present the documents to the user for extraction. Such stations are described in detail in U.S. Pat. No. 9,079,730, the entire disclosure of which is hereby incorporated herein by reference. However, it should be understood that the present system has application to systems that do not incorporate document extraction features but are instead directed to processing documents generally. For instance, features of the present system may be incorporated into a system that does not include the extraction features, but includes the conveyor, imaging station and sorting station. Accordingly, in the following discussion, when used throughout the description and the claims, unless otherwise noted, the term document may refer to any type of written or printed matter and may include envelopes and other mail pieces. Further still, features of the system may have application generally in a document processing system in which it is desirable to manually feed packets of documents into the system without organizing or otherwise preparing the packets for feeding into the system.

The workstation 10 includes a scanner 60 for scanning the documents to obtain image data for the documents. Additionally, the workstation may include any of a variety of feed mechanisms for feeding documents to the scanner. In the exemplary embodiment illustrated in FIGS. 1-3, the system may include a horizontal drop conveyor 40 configured to receive documents in a substantially flat or horizontal orientation. The drop conveyor 40 conveys the documents to a feeder 50. The feeder is configured to serially feed the documents to the scanner 60. The feeder 50 is preferably configured to accommodate a packet of documents so that the feeder can receive the packet from the drop conveyor 40 and then singulate the packet of documents so that the documents are serially fed to the scanner 60.

At the scanner 60, each document is scanned to obtain optical image data for each document. After being scanned, the documents are then sorted to one of a plurality of output bins 70. Alternatively, after being scanned, the documents are discharged to a bypass or through path 75.

Overview

With the foregoing in mind, a general overview of the flow of documents through the workstation 10 is as follows. Initially, one or more documents are provided for processing. For instance, a stack of documents, referred to as a job, is provided. To process the documents, the operator unfolds as needed and drops or places the documents onto a drop conveyor 40 that transports the documents toward a scanner or imaging station 60. An imaging entry feeder 50 receives the documents from the drop conveyor 40 and controls the feeding of the documents into the imaging station 60. The image entry feeder 50 is configured to receive and feed documents of various sizes and condition. For instance, documents may be folded or creased, such as documents that are extracted from an envelope. When the documents are extracted and opened, the documents are creased or folded so that they do not lie flat. The feeder 50 is preferably configured to receive such creased or folded documents and serially feed the folded documents into the imaging station 60 with minimal manual preparation by the operator.

The imaging station 60 includes an imager that obtains image data for each document as the document is conveyed past the device. For instance, preferably the imager is a scanner that obtains gray scale or color image data representing an image of each document. The scanner scans each document at a plurality of points as the document is conveyed past the scanner. Data acquired by the scanner is then processed by one or more image processors. The image processors may be in the form of microprocessors on a separate imaging computer that is connected with the line scan camera. However, in the present instance, the image processor is an embedded processor in the line scan camera assembly. The image processor is operable to convert the image data to gray scale, such as 8-bit grey scale. Additionally, as discussed further below, the image processor is operable to binarize the gray scale image data to create a black and white representation of the document image.

The image data may then be stored in a short term or long-term storage device. For instance, the system may be connected with a network so that the document images may be exported and stored on a server 250, such as a file server. The server may be local, or it may be remote. As discussed above, the system may binarize the image data to create a black and white image. In the present instance, the binarized data is analyzed and used to control the further processing of the document. However, the binarized image data need not be stored on the file server. Instead, the grey-scale image data is stored on the image server.

From the imaging device, an imaging transport conveys the documents to a sorting station 70 that sorts the documents into a plurality of output bins. The documents can be sorted in a variety of ways. For instance, the documents can be sorted based on document information obtained from the image data received at the imaging station 60. Alternatively, the operator may indicate information regarding a document before it is scanned, so that the document is sorted according to the information indicated by the operator. Yet another alternative is that the documents may be stacked into one or more bins simply based on the order in which the documents are processed.

The operation of the different stations is controlled by a central controller, such as a microprocessor 90. The central controller 90 controls the processing of the mail in response to signals received from various sensors at various locations of the workstation 10 and in response to parameters set for the job by the operator. The central controller may also function as an image processor. Specifically, the microprocessor may be configured to process the image data obtained by the scanner. For instance, the image processor 90 may process the image data to attempt to identify and read text. Similarly, the image processor may attempt to identify and read a marking, such as a bar code. Additionally, the system may include an input/output device that provides information to the operator and allows the operator to input information regarding the documents being processed. For instance, the operator may input data that controls how a batch of documents are processed. Additionally, the operator may input information that controls how a particular document or packet of documents is processed. The input/output device may be a touch screen display. Alternatively, the system may include any of a variety of input mechanisms, such as a mouse, touch pad, stylus, or keyboard.

Input Conveyor

The operator may prepare and place one or more documents directly into the feeder. Additionally, the system may include an input conveyor for conveying documents toward the imaging station feeder. The input conveyor may be any of a variety of vertical or horizontal conveyors. FIG. 1 illustrates an exemplary embodiment in which the input conveyor is a horizontal conveyor configured to receive documents in a generally horizontal orientation. The input conveyor may be referred to as a drop conveyor because the input conveyor may be configured to receive documents dropped onto the input conveyor and advance the dropped documents to the imaging feeder.

The input conveyor 100 may be disposed along the front edge of the workstation 10, such that the conveyor is operable to convey documents adjacent to and parallel to the front edge of the workstation. In addition, the conveyor preferably conveys the dropped documents toward the left-hand side of the workstation from the perspective of FIG. 1.

Preferably the conveyor 100 is configured to readily receive a variety of documents having different sizes and different orientation. Additionally, the conveyor is preferably configured to convey documents that are not necessarily flat, such as creased document. More specifically, the input conveyor may be configured to receive documents that are simply dropped onto the conveyor and then convey the dropped documents to the imaging station 210. In this way, the operator can readily unfold documents and simply drop a document or packet of documents onto the conveyor with minimal preprocessing of the documents to prepare the documents for scanning.

FIG. 1 illustrates an exemplary embodiment in which the drop conveyor is a roller bed conveyor. The bed of rollers provides a generally horizontal surface onto which documents can be dropped. The roller bed comprises a plurality of horizontally disposed cylindrical rollers driven by a belt engaging the bottom of the rollers, which in turn is driven by a motor controlled by the system controller. When placed or dropped onto the rollers, the documents rest on the rollers. Therefore, as the rollers 102 rotate, the rollers move the documents forwardly.

The rollers 102 may be parallel to each other and perpendicular to the direction of travel so that the documents move straight along the roller bed 100. However, preferably, the rollers are skewed so that the rollers drive the documents forwardly along the roller bed and laterally toward a justification rail 105. In this way, the skewed rollers 102 drive the documents against the rail 105 to edge-align or justify an edge of the documents against the rail.

Although, the drop conveyor 100 has been described as a roller bed conveyor, alternative types of conveyors can be utilized as the drop conveyor. For instance, the drop conveyor may comprise a horizontal conveyor belt. If a conveyor belt is used, preferably the belt is skewed toward the rail 105 so that the belt justifies the documents against the rail. Alternatively, rather than a single conveyor belt, the drop conveyor may comprise a plurality of smaller conveyor belts onto which the documents may be dropped.

Although the conveyor 100 is referred to as a horizontal conveyor, preferably the drop conveyor is angled downwardly so that gravity urges the documents toward the guide rail 105. Preferably the conveyor 100 is angled at approximately five degrees, however, the angle may be higher, and in fact, the angle of the conveyor may be increased to a point that the conveyor is vertical rather than horizontal. In addition, preferably the imaging station and sorting station are angled downwardly similarly to the drop conveyor.

Image Entry Feeder

Referring to FIGS. 2-5, the details of the image entry feeder 110 will be described in greater detail. The image entry feeder is positioned adjacent the end of the drop conveyor 100, so that the drop feeder conveys the documents to the image entry feeder, which in turn feeds the documents to the imaging station 210. As the documents are conveyed to the image entry feeder 110, the documents are generally horizontally disposed, riding on top of the drop conveyor 100 and are edge-aligned against the justification rail 105.

The image entry feeder 110 is operable to serially feed documents from the drop conveyor 100 to the imaging station 210 so that the documents can be individually imaged. The image entry feeder 110 is operable to receive a number of different types of documents, including individual documents, envelopes, and packets of envelopes. In the following discussion, a packet of documents should be understood to mean a group of two or more documents that are in overlapping relation, as opposed to a number of documents that may be related, but which are conveyed serially to the image entry feeder. A packet may be as few as two documents but may be substantially more. Specifically, as discussed further below, the system may be configured to process large packets of 50, 100 or several hundred documents. When a group of documents becomes large it is commonly referred to as a stack. However, for ease of discussion, it should be understood that a packet includes any group of two or more documents, including large packets commonly referred to as a stack.

When processing packets, the image entry feeder 110 separates the documents from one another and serially feeds each document in a packet to the imaging station 210. The image entry feeder 110 includes a pre-feeder assembly 120 and a singulator 180. The pre-feeder assembly 120 is configured to prepare packets for entry into the feeder 180, thereby reducing the likelihood of a jam occurring as a packet enters or is processed by the feeder.

The pre-feeder assembly 120 comprises a first pre-feeder 130 and a second pre-feeder 140 that control the packet of documents travelling from the drop conveyor 100 to the feeder 180. The first pre-feeder assembly 130 includes a pair of opposing rollers 132 and 134 that form a nip. An angled belt 115 at the end of the justification rail 105 overhangs the conveyor 100 and directs the documents downwardly toward the nip of the first pre-feeder assembly 130. More specifically, for folded documents that were unfolded but remained creased, or documents that are otherwise not flat, an upper edge of the documents tends to be spaced off the surface of the drop conveyor. The justification rail 105 has a lip overhanging the drop conveyor 100, so that this upper edge of the documents tends to be displaced under the lip of the justification rail as the conveyor tends to move the documents toward the justification rail. The angled belt interacts with the justification rail 105, so that the upper edge of the folded documents is flattened downwardly toward the conveyor so that the leading edge of the document can enter the nip of the first pre-feeder assembly rather than folding over.

As mentioned above, the first pre-feeder assembly includes an upper roller 132 and a lower roller 134 that form a nip. The upper roller 132 is a drive roller, and the lower roller 134 is a driven roller. The upper roller 132 is mounted on a displaceable arm that pivots about a pivot axis. A biasing element biases the pivot shaft to urge the upper roller 132 toward the lower roller 134. As documents enter the first pre-feeder assembly 130, the roller and pivoting arm pivot away from the lower roller against the bias of the biasing element to form a gap large enough to accommodate the document or packet of documents entering the first pre-feeder assembly.

As the trailing end of the document or packet of documents exits the first pre-feeder assembly 130, the upper roller 132 pivots into engagement with the driven roller 134 until the subsequent document or packet enters the first pre-feeder assembly. Alternatively, if the packet includes numerous documents, an actuator may pivot the upper roller 132 upwardly (counterclockwise from the perspective of FIG. 4) to reduce the likelihood that the first pre-feeder 122 pushes the top documents off the packet as the packet enters the first pre-feeder.

From the first pre-feeder assembly 130, the documents enter the second pre-feeder assembly 140. The second pre-feeder also includes a driven upper roller 142 biased toward a driven lower roller 144 to form a nip.

As discussed above, the first and second pre-feeders 130, 140 comprise drive rollers that are biased toward opposing driven rollers. Although the upper drive rollers 132, 142 are pivotable to accommodate thick packets of documents, the upper rollers may tend to push the upper documents in the stack rearwardly (i.e., upstream toward the drop conveyor) as the packet enters the pre-feeders. To maintain the packets in a neat stack, it may be desirable to automatically lift the upper rollers 132, 142 of the pre-feeders prior to the packet entering the first pre-feeder 130.

The pre-feeder assembly 120 may be controlled so that the pre-feeder arms are pivoted upwardly before each document or packet of documents enters the pre-feeder assembly. However, lifting the pre-feed roller 132 and 142 is primarily beneficial when the packet is a thick packet of a significant number of documents. Accordingly, the system monitors the thickness of documents as they are conveyed along the drop conveyor 100. If a packet of documents exceeds a threshold, the pre-feeder arms are lifted before the packet enters the pre-feeder assembly.

A variety of sensors can be used to measure the thickness of packets on the conveyor 100. In the present instance, one or more sensors are mounted on the justification rail upstream from the pre-feeder. If the sensor detects a thickness exceeding a threshold, the controller sends signals to the motors connected to the pre-feed arms to lift the arms.

Once the upper rollers 132, 142 are raised, the drop conveyor 100 continues to drive the packet forwardly into the pre-feeder assembly. A first sensor between the first and second pre-feeder is operable to detect the leading edge of the packet. Once the first sensor detects the leading edge of the thick packet, the first pre-feed arm pivots downwardly so that drive roller 132 contacts the top document in the packet. The second pre-feed roller 142 may be lowered at the same time.

Figure 4:
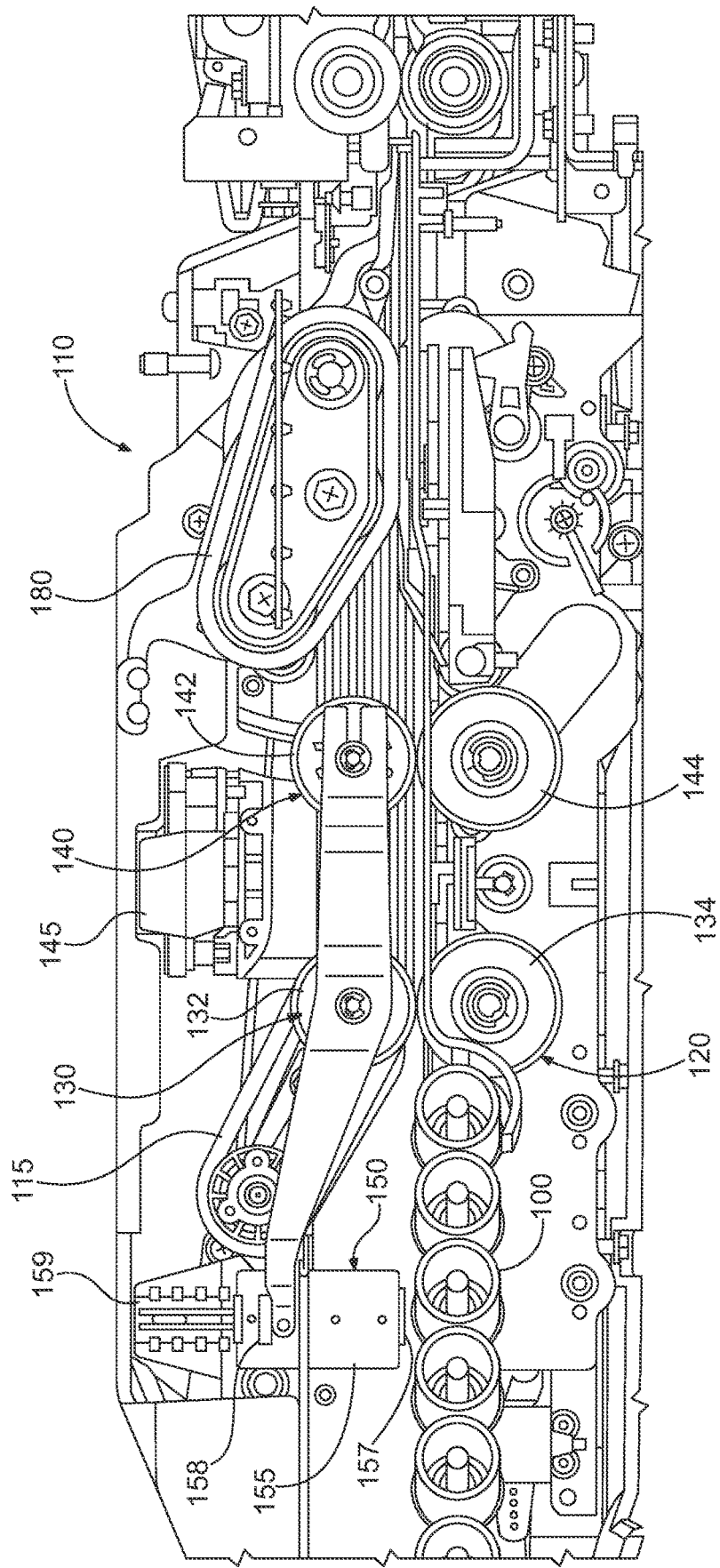
FIG. 4 is an enlarged fragmentary side view of the feeder illustrated in FIG. 2.

As shown in FIG. 4, a packet detector 145 is positioned between the first pre-feeder assembly 130 and the second pre-feeder assembly 140. The packet detector may be configured to provide indicia of the number of documents being conveyed from the first pre-feeder assembly 130 to the second pre-feeder assembly. In one manner, the thickness detector may determine the thickness of the document or packet of documents and then estimates the number of documents based on the assumed thickness for an individual document. However, in the present instance, the thickness detector 145 does not directly measure the thickness of the document or packet. Instead, the thickness detector 145 is an ultrasonic detector that uses ultrasound waves emitted from a transmitter and received by a receiver. Based on the signals received by the receiver, the number of transitions between sheets of papers can be determined to evaluate how many documents are in a stack. More specifically, the packet detector 145 detects whether the transaction in the pre-feeder is a packet of two or more documents as opposed to a single document.

From the pre-feeders 130, 140, the documents advance to a singulator 180. The singulator is a feed belt that rotates about a series of rollers. A retard opposing the feeder forms an entry path for the packet of documents. Rotation of the singulator in a first direction feeds the top document from a packet of documents, while the retard impedes displacement of the remaining documents in the packet. In this way the feeder feeds the documents to the imaging station one at a time.

Figure 5:
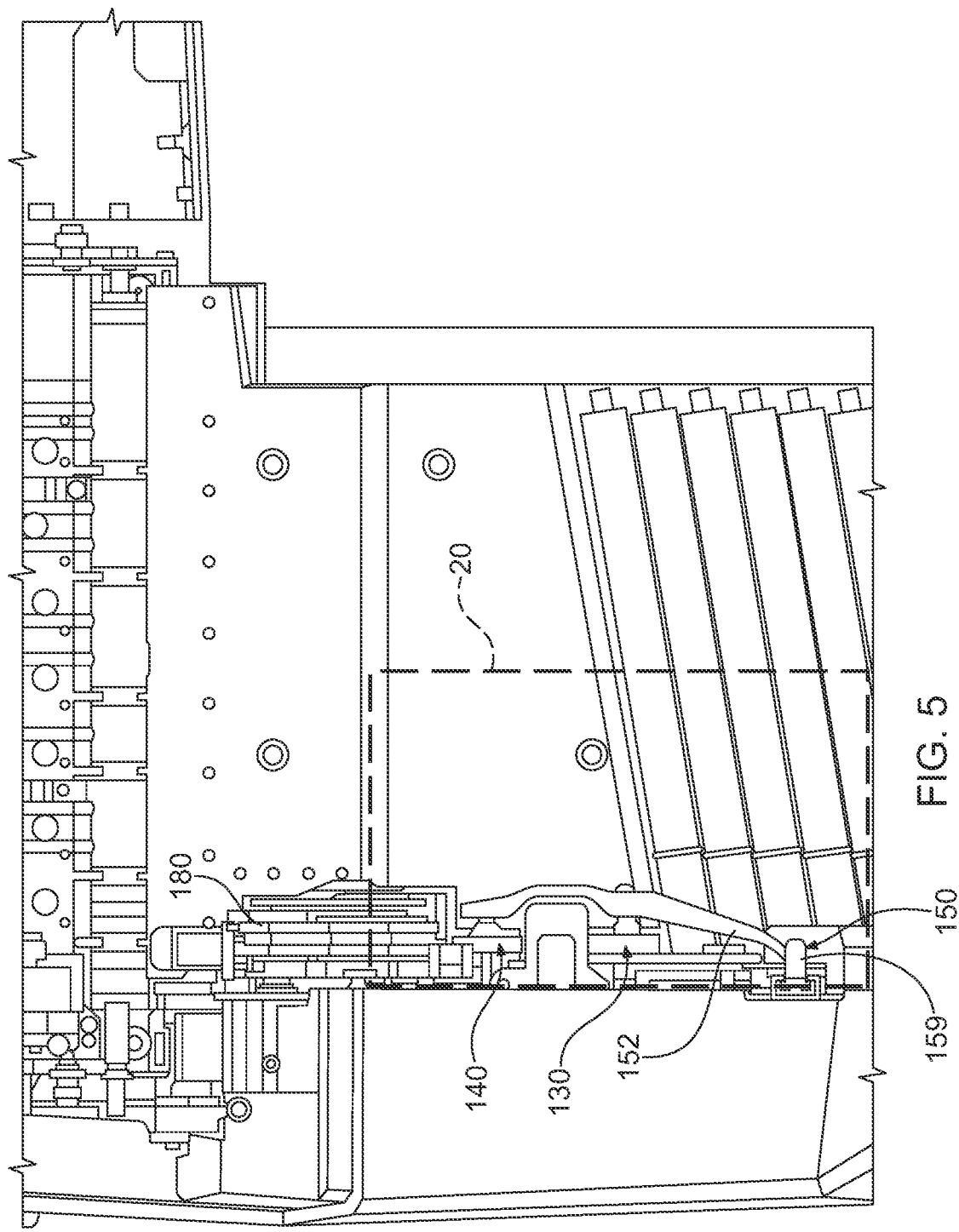
FIG. 5 is a fragmentary plan view of the feeder illustrated in FIG. 2.

As shown in FIG. 5, when a first edge of a document 20 is justified against the justification rail, the singulator 180 engages the document that is adjacent the justified edge. In this way, the singulator 180 may apply a forward driving force on the document 20 that is applied at a point that is spaced apart from the centerline of the document. Therefore, the forward force applied to the document may cause the document to skew when the singulator drives the document forward. Skew refers to any rotation of the document that causes the edges of the paper to shift or rotate transverse the direction of travel. Specifically, a properly oriented document has edges that are parallel to the justification rail 105. Skew refers to displacement of the document at an angle transverse the justification rail that tends to cause an edge of the document to pivot or shift to an orientation that is transverse the justification rail.

Skew can adversely affect the scanned images of the documents. Therefore, the pre-feed assembly optionally includes a mechanism for preventing or reducing skew as the documents are fed to the imaging station.

Referring to FIGS. 2-5, a skew reduction assembly 150 is illustrated. The skew reduction assembly is configured to apply a force on the document 20 that impedes the tendency of the document to rotate or skew in response to the force applied by the singulator 180. In particular, the skew reduction assembly 150 applies a drag force to the document that is directed rearwardly, opposite of the drive force applied by the singulator 180. Additionally, as shown in FIG. 5, the skew reduction assembly is positioned adjacent the justification rail so that the drag force is applied adjacent the justified edge. In this way, the drag force is applied at a point that is spaced apart from the centerline of the document on the same side that the driving force is applied by the singulator. Accordingly, from the perspective of FIG. 5, the drag force created by the skew reduction assembly tends to create a counterclockwise torque applied to the document, while the driving force created by the singulator tends to create a clockwise torque applied to the document. In this way, the skew reduction assembly tends to apply a torque to the document that is opposite to the torque applied by the singulator.

Referring to FIG. 4, the details of the skew reduction assembly 150 will be described in greater detail. The assembly includes a weighted retard 155 that rests upon the top of a stack of documents. The weighted retard 155 comprises a block of material providing a desired weight to be applied to the stack of documents. The entire block may be formed of a high friction material. However, in the present instance, a high friction pad 157 is applied to the bottom surface of the weighted block 155. High friction is generally defined as having a higher coefficient of friction than standard paper. For instance, the coefficient of friction is higher than 0.5. Optionally, the coefficient of friction is higher than 0.75 and may be higher than 1.0.

The retard block 155 is displaceable between a raised position and a lowered position. In the raised position the retard is displaced above the paper path so that the block is above documents on the conveyor 100 and in the pre-feeder assembly 120. In the lowered position, the retard block 155 is positioned on top of a packet of documents. Optionally, in the lowered position, the retard block may be spaced apart from the surface of the conveyor 120 so that a gap is formed between the conveyor and the bottom surface 157 of the retard block as shown in FIG. 4. The gap in the lowered position is high enough to allow single sheets to pass without engaging the retard block. Optionally, the gap may be large enough for small packets (such as packets having a few sheets) to pass without engaging the retard block.

The weighted retard 155 is displaceable between the raised and lowered positions by a mounting arm 152. In the present instance the mounting arm is connected with the first pre-feeder 130 and optionally with the second pre-feeder 140 so that displacement of the first pre-feeder and/or second pre-feeder 140 also displaces the mounting arm.

The skew reduction assembly 150 may be configured so that it engages the trailing end of a packet of documents when the leading end of the packet is staged at the singulator 180. In this way, the skew reduction assembly acts on the packet at a point spaced rearwardly from the mid-point of the length of the packet.

The mounting arm 152 may be an elongated arm that extends rearwardly from the first pre-feeder 130. Optionally, the mounting arm 152 extends rearwardly to position the weighted retard 155 above the conveyor 100. The mounting arm 152 may also extend inwardly toward the justification rail to position the weighted retard adjacent the justification rail.

Figure 2:
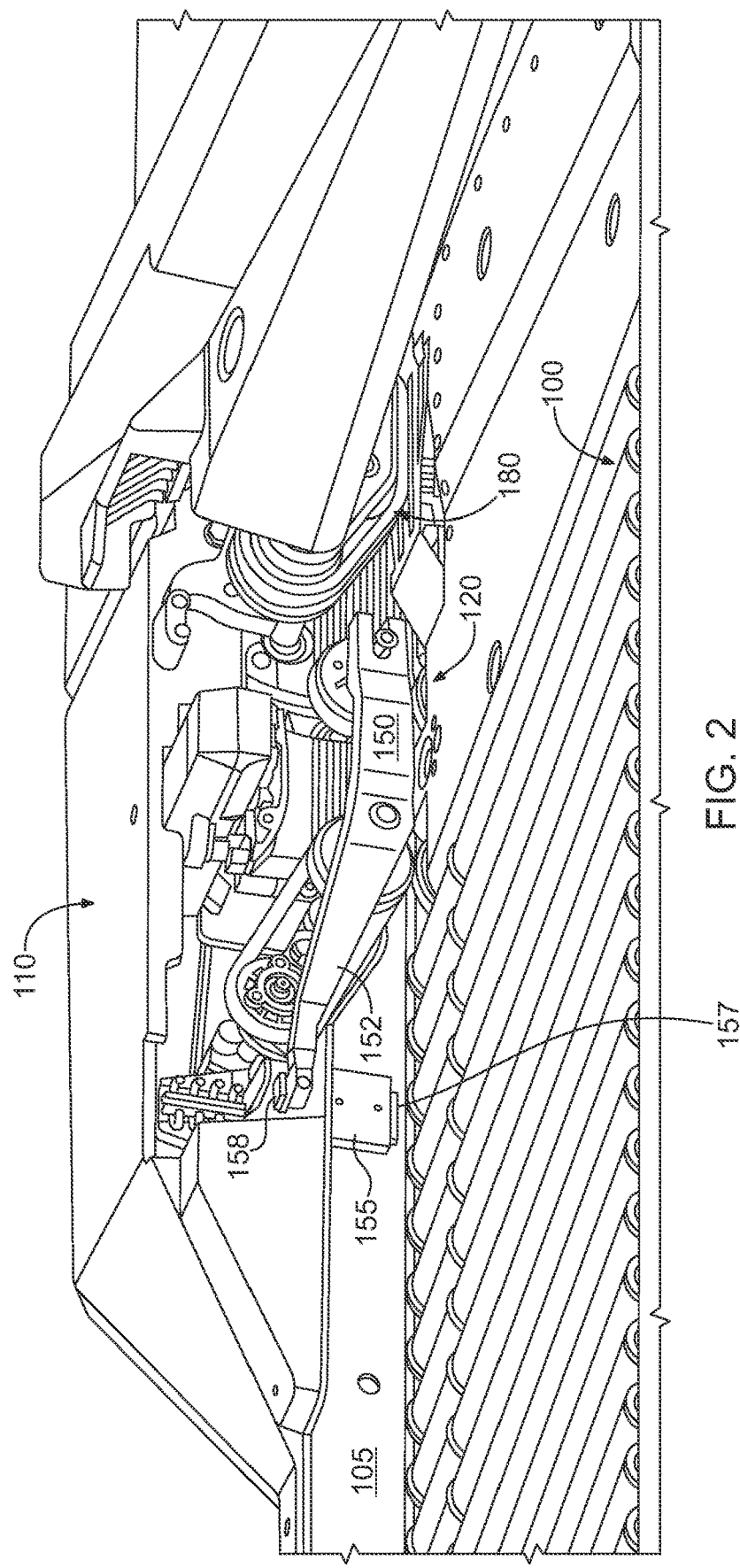
FIG. 2 is an enlarged rear perspective view of a feeder of the system illustrated in FIG. 1.
Figure 3:
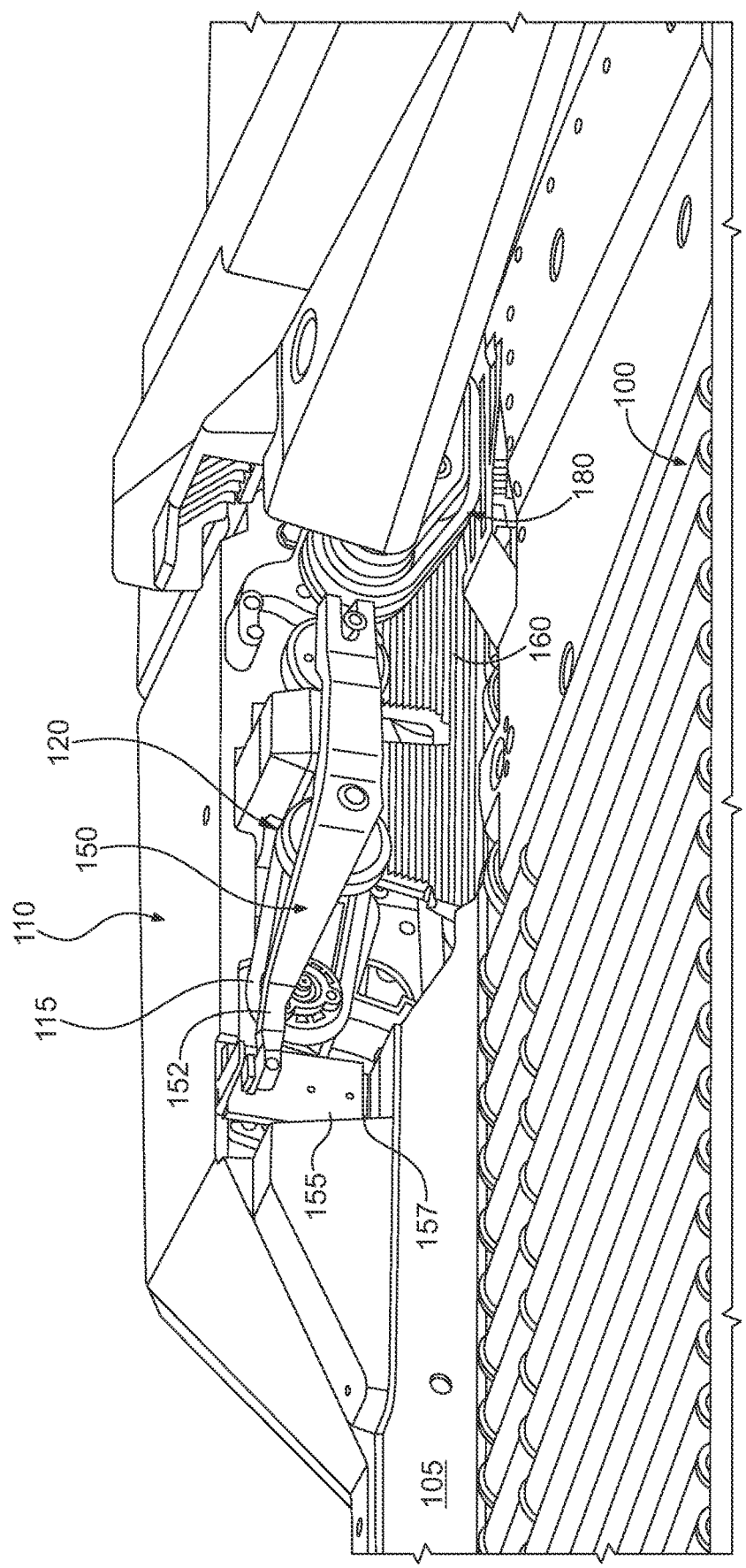
FIG. 3 is an enlarged rear perspective view of the feeder illustrated in FIG. 2 showing a pre-feeder in a raised position.

The weighted retard 155 may be fixedly or pivotably connected with the mounting arm 152 so that the retard moves up and down as the arm moves up and down. Alternatively, the weighted retard may be releasably connected with the arm 152. For instance, a lifting tab 158 may project outwardly away from the body of the retard as shown in FIG. 2. The lifting tab 158 may be positioned over the end of the mounting arm 152 so that the lifting tab opposes the arm. Therefore, when the mounting arm is lifted upwardly the arm engages the lifting tab thereby lifting the retard 155. Conversely, when the arm 152 is displaced downwardly, the weight of the retard 155 causes the weight to move downwardly resting on the end of the mounting arm. However, if the lower surface 157 of the retard 155 engages the top of a packet of documents, the tab will disengage from the mounting arm as the moves downwardly.

The skew reduction assembly 150 may also include a track 159 for guiding the retard 155 as it is displaced vertically. For instance, referring to FIG. 5, the track 159 may include a vertical channel and the retard 155 may include a flange that projects into the vertical channel to guide the vertical displacement of the retard.

Imaging Station

From the feed station 110, the documents enter the imaging station 200, which scans the documents to obtain image data for each document. Preferably, the imager comprises a pair of scanners 210 for scanning both sides of the document. Specifically, preferably the imager 200 includes a lower plate in which the lower scanner 210 is located, and an upper plate in which the upper scanner is located. The lower scanner 210 scans the bottom face of the document, and the upper scanner scans the upper face of the document.

Although the scanners may be black and white or gray scale, preferably, the scanners 210 are color scanners. More specifically, preferably the scanners 210 are contact image sensor (CIS) modules formed of arrays of photodiodes that operate as scanning elements, and LED light sources.

Figure 6:
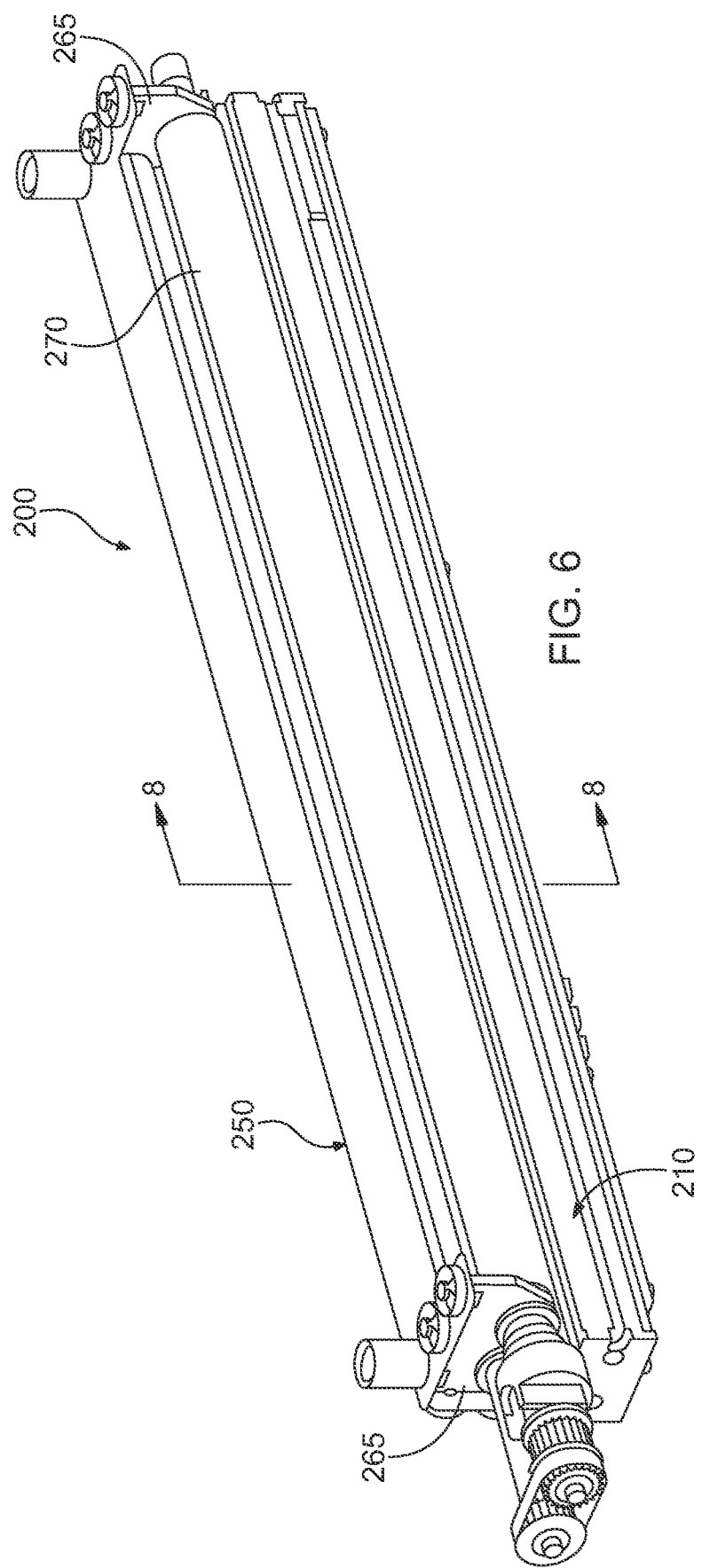
FIG. 6 is a perspective view of an imaging assembly of the system illustrated in FIG. 1.
Figure 7:
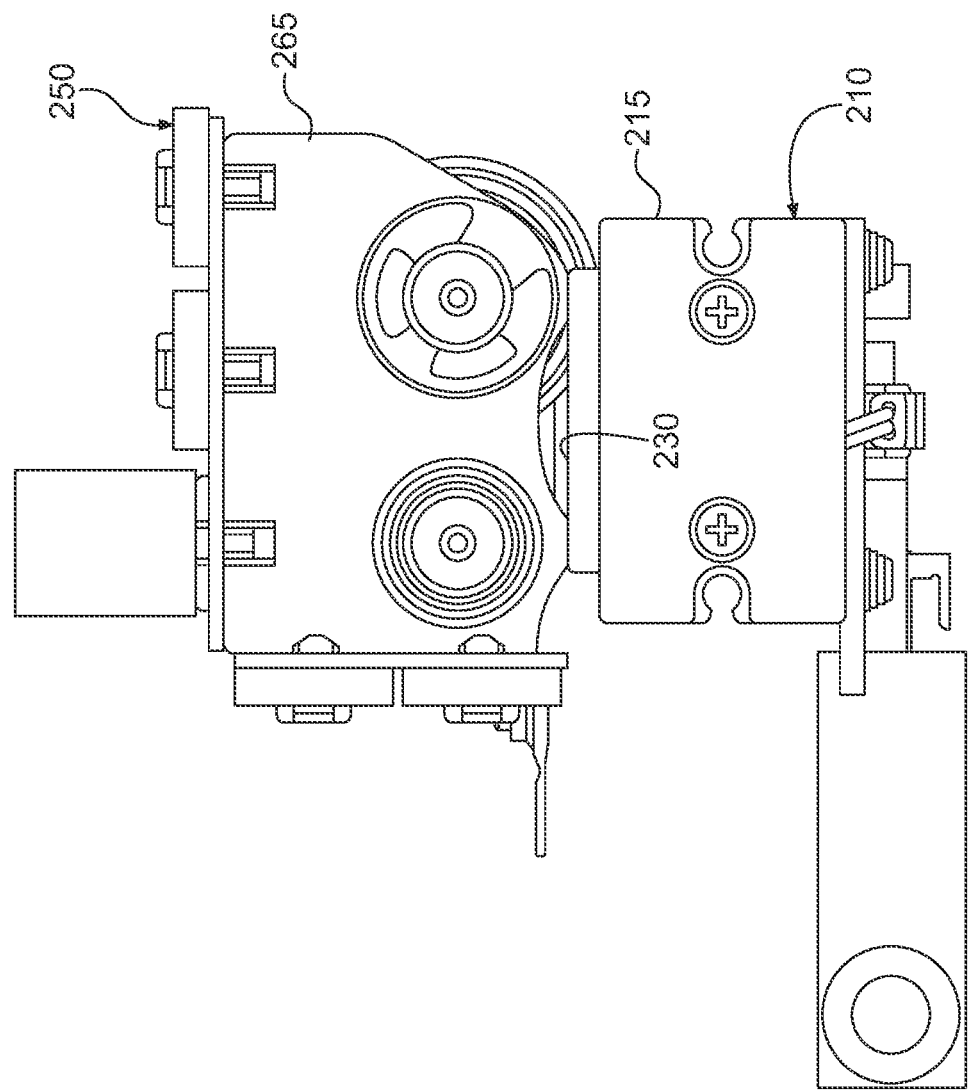
FIG. 7 is an enlarged fragmentary end view of the imaging assembly illustrated in FIG. 6.
Figure 8:
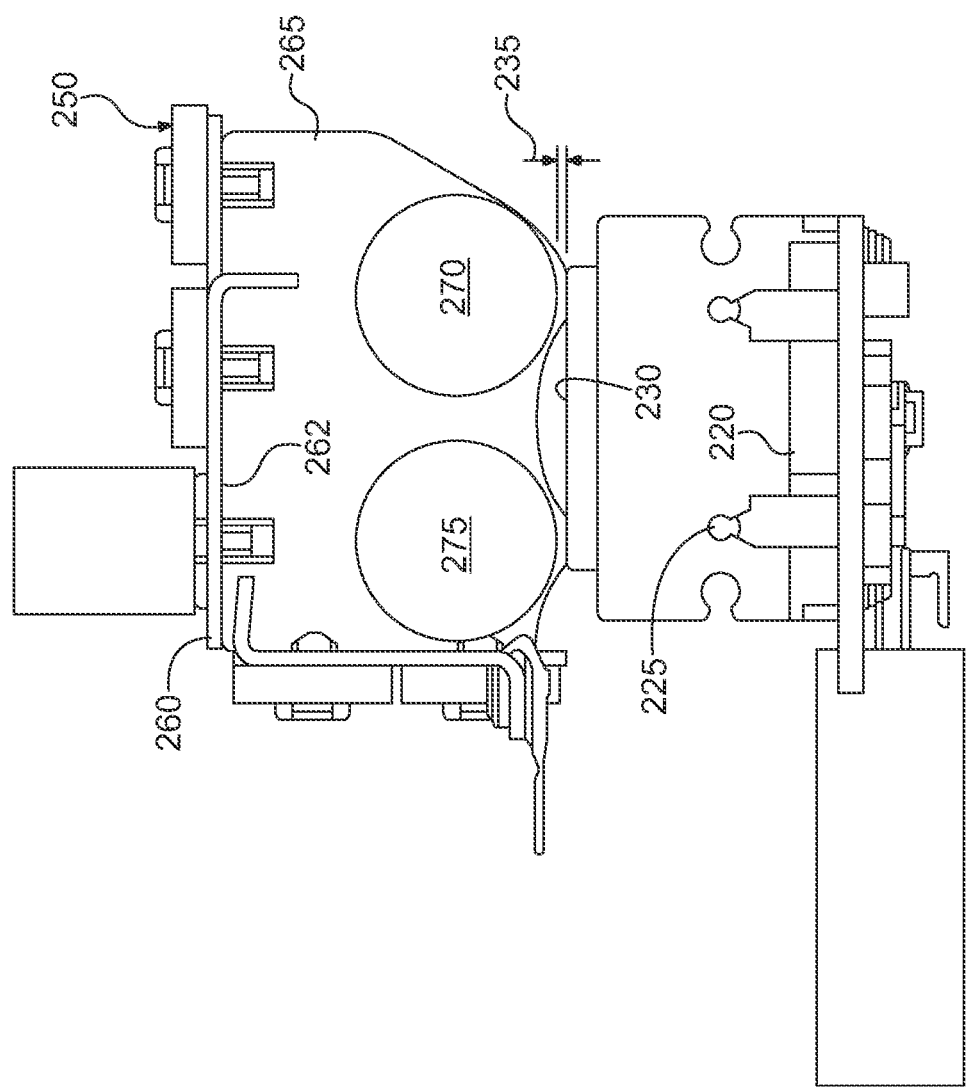
FIG. 8 is a cross-sectional view of the imaging assembly illustrated in FIG. 6 taken along line 8-8.

Referring to FIGS. 6-8, details of an imaging station 200 are illustrated. As noted above, the imaging station may include an upper scanner and a lower scanner. The details of the upper and lower scanners are substantially identical except that the upper scanner is inverted relative to the lower scanner. Accordingly, in the following discussion only one of the scanners is illustrated and described. It should be understood that the description of the scanner applies for both the upper and lower scanners 210.

The scanner/imaging assembly 210 comprises an elongated housing 215 that extends across the width of the document path. The housing has a length that is as long or longer than the width of the widest document to be processed by the scanner. The housing is generally box-shaped, having an open upper surface. A glass cover or lens 230 extends across the open upper surface of the housing. A contact image sensor PCB circuit (CIS) 220 is positioned in the bottom of the housing 210. The CIS comprises a series of elements that extend along the length of the housing so that the CIS extends across the width of the paper path. In this way, the imaging sensor is able to obtain image data along the width of the paper path. A plurality of light elements 225 provide lighting to illuminate the documents as they pass over the CIS.

The imaging station 200 may optionally include a roller assembly 250 opposing the scanner 210. The roller assembly is configured to provide a background surface for the documents and one or more drive rollers to prevent documents from jamming or folding when passing between the scanner and the background surface.

The roller assembly 250 includes a roller housing 260 that overlies a pair of rollers, a leading roller 270 and a trailing roller 275. The housing and rollers extend across the width of the paper path and are substantially coextensive with the scanner 210. The rollers 270, 275 are spaced apart from one another by a gap. Specifically, the gap between the rollers is wider than the field of view of the scanner 210 so that the rollers 270 and 275 are outside the field of view of the scanner. The end of each roller 270, 275 is supported by an end bracket 265, which retains the rollers parallel and properly spaced from each other. Optionally, as shown in FIG. 6, the rollers may be operatively connected, such as by a timing belt so that the rollers are synchronously driven. For instance, as discussed further below, the rollers may be synchronously driven in a clockwise direction from the perspective of FIGS. 7-8.

The roller assembly 250 is biased toward the upper surface of the scanner 250. The end brackets 265 may be configured so that when the end bracket contacts the upper surface 230 of the scanner, the rollers 270, 275 are spaced apart from the upper surface 230 of the scanner 210. The gap formed between the rollers 270, 275 and the scanner surface 230 is designated 235 in FIG. 8. This gap 235 is preferably greater than the thickness of standard thickness of paper. For instance, the gap 235 may have a height of 0.020".

The image sensor 220 of the scanner 210 is directed upwardly toward the gap between the leading roller 270 and the trailing roller 275. In other words, the rollers 270, 275 straddle the field of view of the scanner 210. In this way, the inner surface 262 of the roller housing 260 provides a background for the scanner 210. The inner surface 262 is configured to substantially reduce light reflected back toward the imaging array. For instance, the inner surface may comprise a substantially light absorbing surface, such as flat black. Additionally, the interior surface may be covered with a light absorbing finish, such as flocking. In this way, as a document passes between the roller assembly 250 and the imaging assembly 210, the portions of the housing 260 that are not covered by the document will scan as substantially black. Therefore, an image processor can process the image data to identify the edges of the document by using the dark black edges as an indicator of the document edge. Similarly, the leading and trailing edges of the document will appear as substantially black because the gap between successive documents will leave the guide uncovered.

As noted above, the rollers 270, 275 are spaced apart from the scanner surface 230. In this way, the rollers do not form a nip that drives the documents through the scanning station. Instead, rollers upstream from the scanner nip the documents and provide a drive force driving the documents through the scanning station. Similarly nipped rollers downstream from the scanner engage each document to provide a drive force driving the documents away from the scanning station.

Rather than provide a forward driving force, the rollers 270, 275 selectively guide the documents into the gap 235 between the rollers and the scanner. Specifically, the rollers 270, 275 rotate clockwise from the perspective of FIG. 8. If a document is substantially flat, the document may pass right through the gap 235 and over the scanner 210. In such an instance, the rollers 270, 275 may not engage the document.

In contrast, if a document is creased or folded, the leading edge of the document may project upwardly above the upper limit of the gap 235. In such an instance, the leading roller 270 will engage the leading edge of the document and guide the leading edge downwardly toward the upper surface 230 of the scanner 210. In this way, the leading edge will be guided through the gap 235. Similarly, after passing over the field of view of the scanner, the leading edge may be bent or creased and therefore may project upwardly above the height of the gap 235. In such an instance, the trailing roller will guide the leading edge downwardly through the gap 235. Once the leading edge passes through the gap 235 with the trailing roller, the leading edge of the document is engaged by the downstream nipped rollers, which then pulls the document through the gap and over the scanner surface.

Sorting Station

From the scanning station 200, the documents are conveyed to a sorting station 300 as shown in FIGS. 9-12. The sorting station includes a plurality of sort bins 400, 402, 404, 406 and 408 for receiving the scanned documents. Alternatively, documents may be scanned and directed to a bypass path and into a bypass bin 410.

Figure 9:
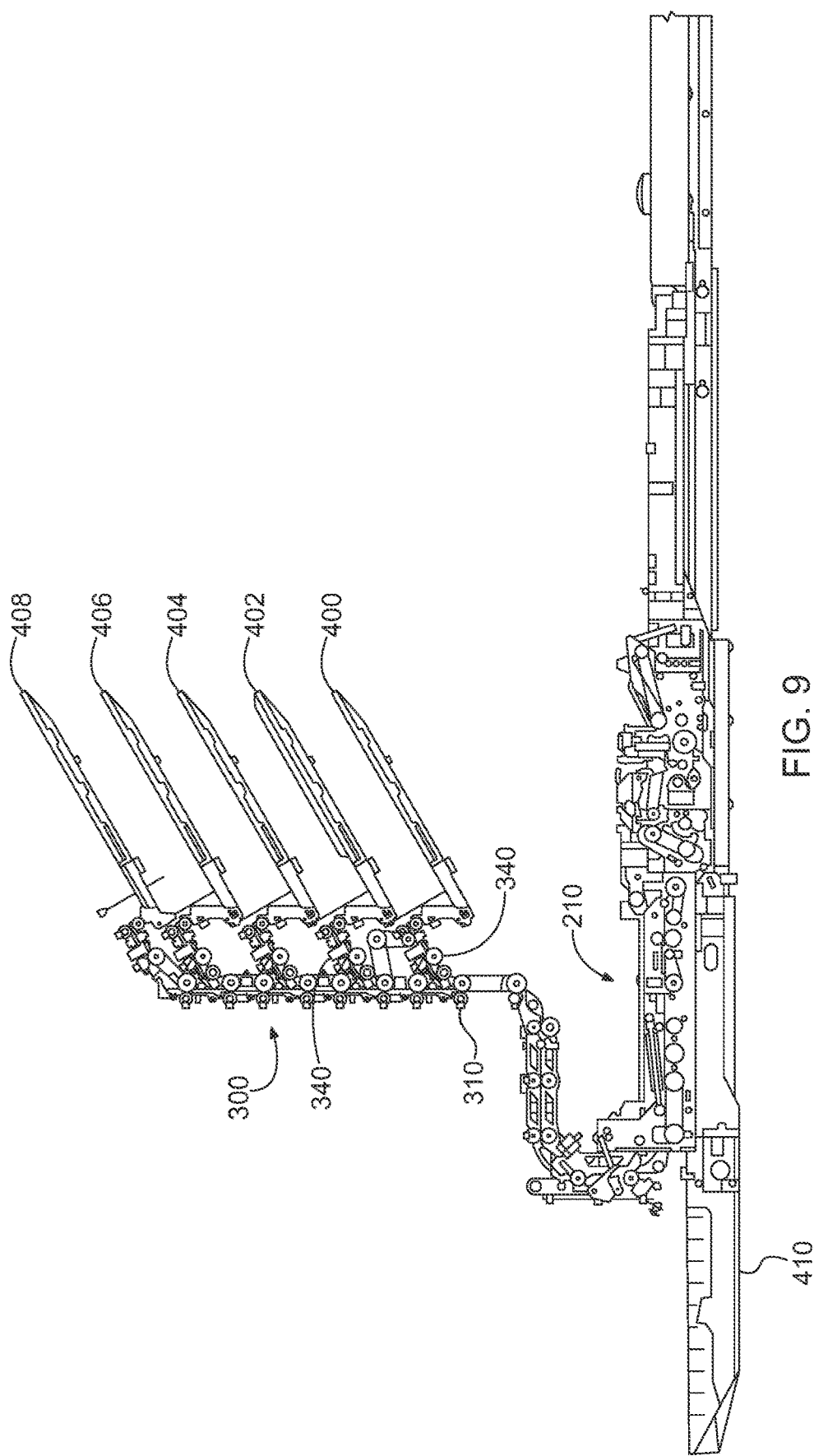
FIG. 9 is a side view broken away of the feeder and sorter of the system illustrated in FIG. 1.
Figure 10:
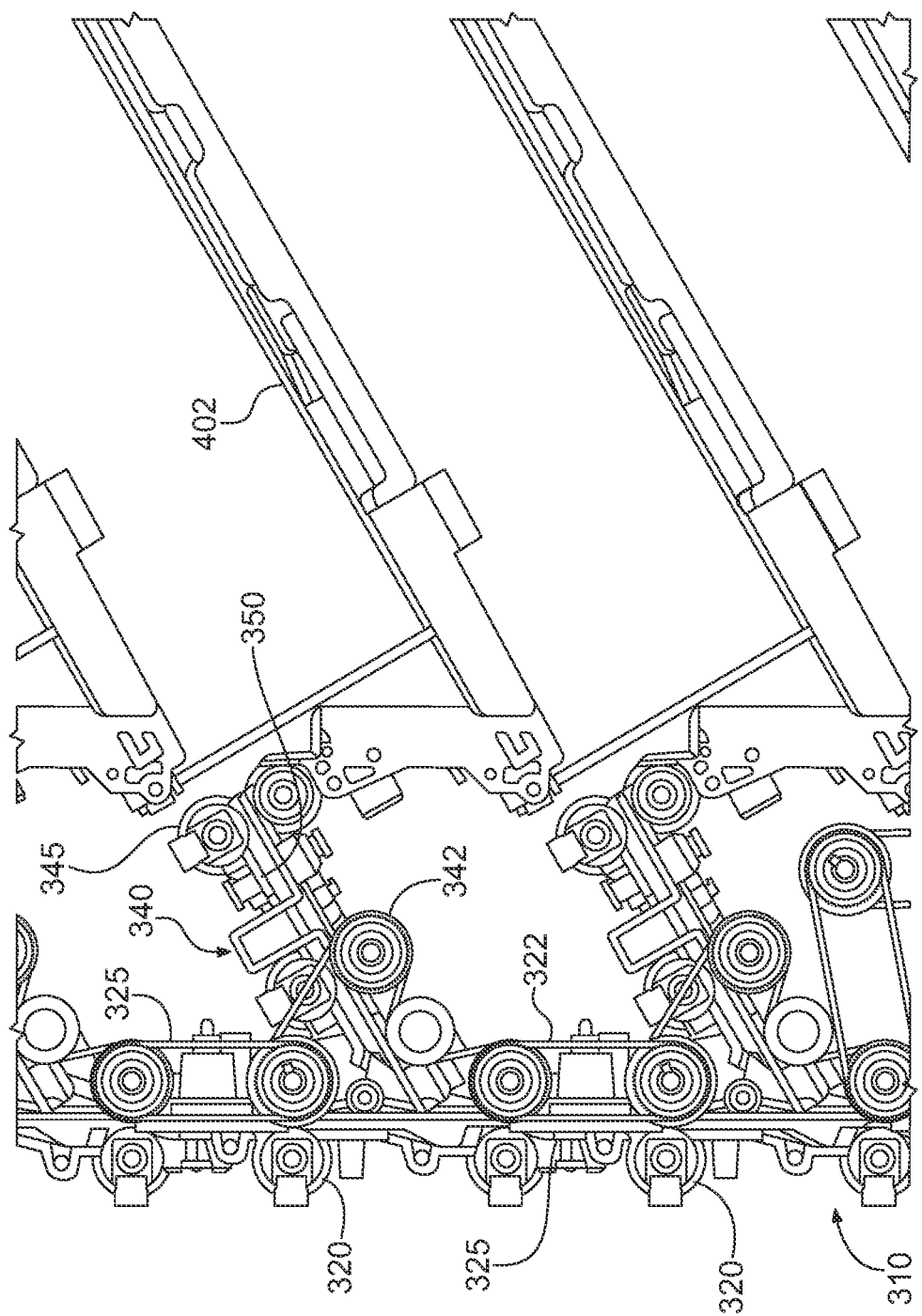
FIG. 10 is an enlarged fragmentary side view of a portion of the sorter illustrated in FIG. 9.
Figure 11:
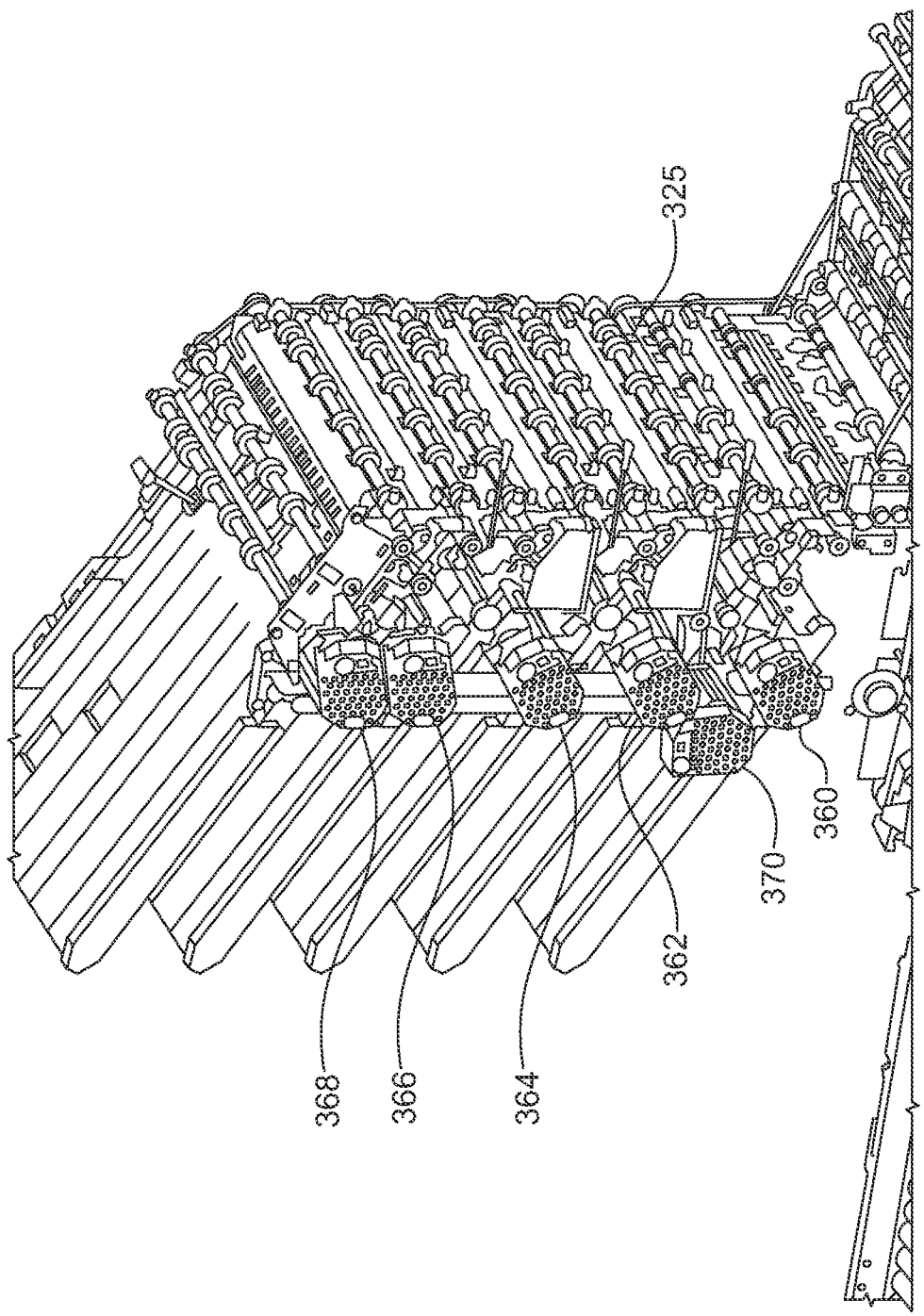
FIG. 11 is a fragmentary rear perspective view of a portion of the sorter illustrated in FIG. 9.
Figure 12:
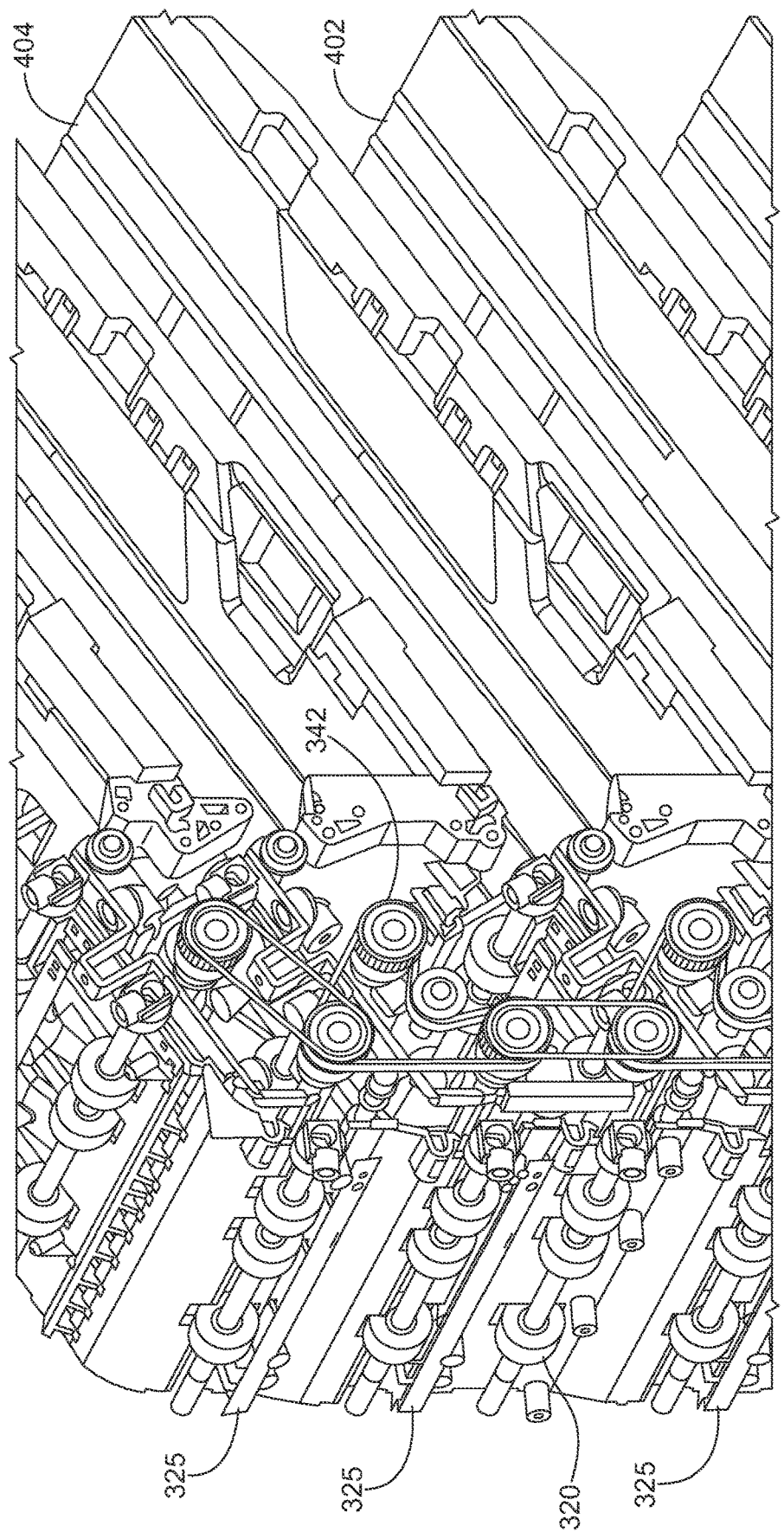
FIG. 12 is an enlarged fragmentary perspective view of a portion of the sorter illustrated in FIG. 9.

A document path extends from the scanning station 200 to the sort bins 400-408. In the present instance, the document path turns upwardly to drive the documents along a vertical path 310. The vertical path leads to a plurality of sort paths 340 each of which leads to one of the bins 400-408. As shown in FIGS. 9-10, the vertical path 310 comprises a series of opposing rollers 320 forming drive nips along the length of the path. Additionally, as can be seen in FIGS. 11-12 each roller 320 includes a plurality of rollers spaced apart across the width of the document path so that the vertical path engages the documents across the width of the document to drive the documents forward.

A variety of sort criteria or sortation schemes may be used to sort the documents into the different bins 400-410. For instance, the documents may simply be sorted to the upper most bin 408 until the bin is full at which point the documents are then directed to the next bin, such as bin 406. In this way the document sorting may act as a waterfall in which documents are fed to a bin until it is full at which point the documents are sorted to the next bin. Alternatively, the documents may be sorted to one of the bins based on a characteristic of the document. For instance, documents having a thickness above a predetermined threshold may be directed to the bypass bin 410. Similarly, documents identified as being a first type of document may be sorted to bin 400 while documents identified as being a second type of document may be sorted to bin 402. The document type for a document may be determined based on a physical characteristic of the document, such as length, thickness, width etc. Alternatively, the document type may be determined based on a characteristic identified from the image data scanned for a document. For example, the image data for a document may be processed to determine whether the document has a certain marking. Documents having the marking may be directed to a particular one of the bins 400-410.

Regardless of the sorting scheme utilized for a batch of documents, documents that are identified as documents to be directed to one of bins 400-408 are directed up vertical path 310. The vertical path 310 drives the documents upwardly toward the sort path. A series of gates 330 associated with bins 400-406 are selectively actuated to divert the documents to an appropriate bin. Specifically, each gate is displaceable between a first position and a second position. In the first position the gate allows the document to continue along the vertical path. In the second position the gate diverts the document to the adjacent sort path.

Each sort path optionally includes an entry nip 342 formed by a pair of opposing rollers. Additionally, each sort path includes a discharge nip 345 formed by a pair of opposing rollers. As noted above with the rollers 320 of the vertical path 310, the rollers of the entry nip and the discharge nip are a series of opposing rollers extending across the width of the paper path.

The entry nip 342 and the discharge nip 345 may be interconnected with the rollers 320 of the vertical drive so that the rollers in the sort path are also driven by the vertical path. However, in the present instance, a separate drive is provided for one or more of the rollers in each sort path. For instance, referring to FIG. 11, optionally the sorter 300 includes a first motor 370 that drives the vertical path 310. Additionally, optionally the sorter includes one or more separate motors for driving one or more rollers of the sort paths. For instance, the sorter may include a first sort path motor 360 for driving the first sort path to bin 400. Similarly, the sorter may include a separate motor 402, 404, 406, 408 for each of the sort paths for bins 402, 404, 406, 408.

Each separate sort path drive motor 360-368 may be interconnected with all of the rollers in each respective sort path. Alternatively, as illustrated in FIG. 10, in the present instance, each sort path motor is directly connected with just the discharge nip of the respective sort path. For instance, the sort path 340 leading to sort bin 402 includes discharge nip 345. Sort path drive motor 362 directly drives the drive roller axle of discharge nip 345. Therefore, operation of sort path drive motor 362 controls the operation of discharge nip 345. Additionally, the entry nip 342 to sort path 340 is optionally connected with the vertical path drive motor 370. For instance, a drive belt interconnects the drive roller of entry nip 342 with the rollers 320 of the vertical path. In this way, the entry nip 342 is driven at the same speed as the vertical path and is controlled by operation of the vertical path drive motor 370.

The sorting station includes a plurality of sensors for detecting the presence of the documents. For instance, the sorting station may include a plurality of infrared sensors that straddle the path. In such an embodiment, an IR emitter is on one side of the document path and an IR detector is on the opposite side of the document path. When a document passes the sensor, the document blocks the detector thereby providing a signal indicative of the presence of the document. The central controller controls operation of the various aspects of the sorter in response to signals received from the sensors. The sensors are positioned at various points along the document path, including the vertical path and the sorter paths. It should also be understood that at each point along the path that a sensor is located, the sensor may be an assembly that includes a plurality of sensors extending along the width of the document path. For instance, referring to FIG. 11, the sensor 325 is a pcb assembly extending across the width of the document path having a plurality of sensors spaced apart from one another along the length of the pcb assembly.

Additionally, the system may include one or more sensors for detecting the movement of documents along the sort paths 340. For instance, referring to FIG. 10, each sort path may include one or more sensors 350 to detect the presence of a document. The sensor 350 may be positioned at any point along sort path 340 or alternatively, the sensor may be positioned along the vertical path and in some applications, the signals from the document sensors 325 in the sort path can be used to control the documents as they move through both the vertical path 310 and the sort path as described below.

In the present instance, the sensor 350 is positioned adjacent the discharge nip 345 and is upstream from the discharge nip. In this way, the sensor 350 detects the leading edge of each document prior to entering the discharge nip 345. Additionally, the sensor detects the trailing edge of each document prior to entering the discharge nip.

The distance between the sensor 350 and the discharge nip 345 is a predetermined distance so that the time it takes the leading edge to enter the discharge nip after being detected by the sensor is known based on the speed that the document is moving after the leading edge passes the sensor. Similarly, the time that it takes the trailing edge to enter the discharge nip after passing the sensor 350 is known based on the speed that the document is moving after it passes over the sensor.

For instance, as described further below, as the document moves along the discharge path 340 upstream from the discharge nip 345, the document may move at a first speed that is the same as the speed the document moves along the vertical path 310. Once the document passes the sensor 350, the time it takes to enter the discharge nip 345 is known based on the distance between the sensor 350 and the discharge nip and the first speed.

Once the document enters the discharge nip 345, the speed of the document may be controlled by the discharge nip. The document speed may be selectively increased or decreased by the discharge nip. For instance, once the leading edge enters the discharge nip 345 the speed of the discharge nip may increase to a second speed so that the discharge nip acts as a pullout nip pulling the document through the entry nip 342 which continues to operate at the first speed. Similarly, the discharge nip may reduce the speed of the document to a third speed that is below the second speed and optionally is below the first speed. The timing of the increases and/or decreases in speed as the document moves through the discharge nip may be controlled based on the signals received by the sensor 350.

Figure 13:
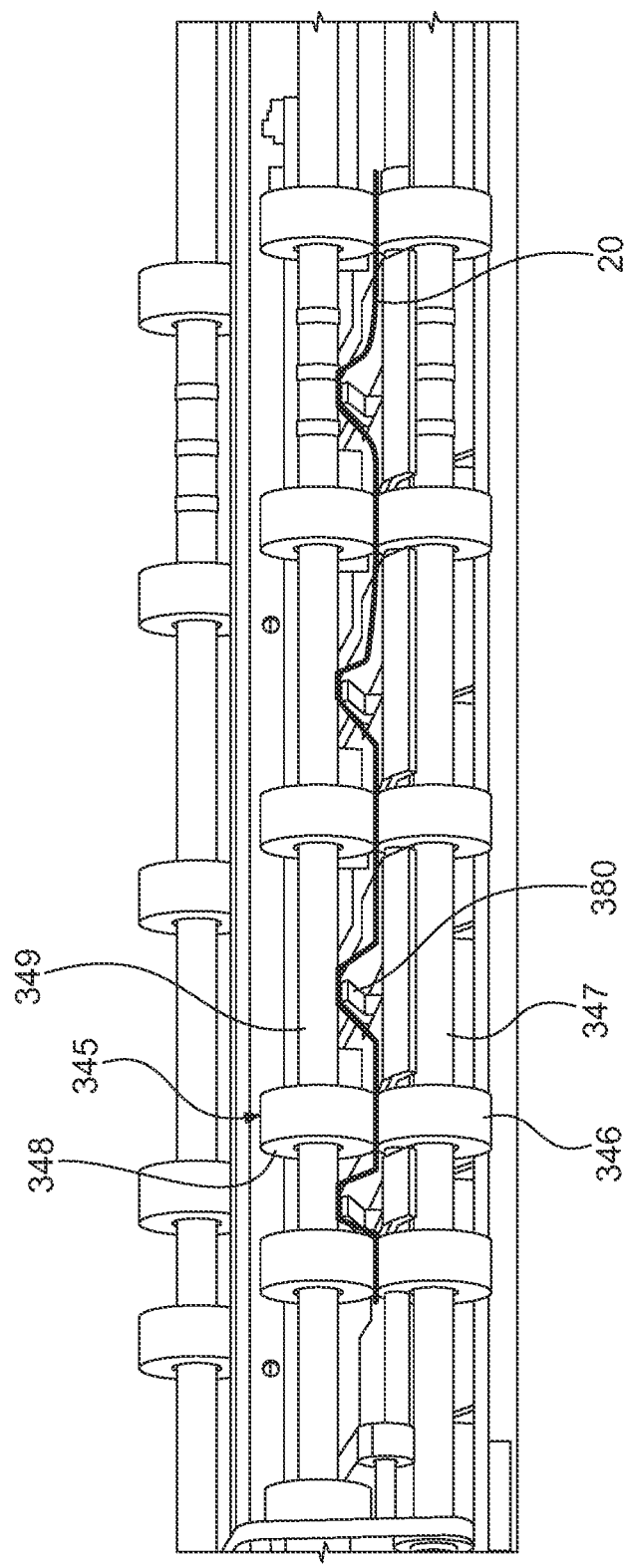
FIG. 13 is an enlarged fragmentary perspective view of a portion of the sorter illustrated in FIG. 9.
Figure 14:
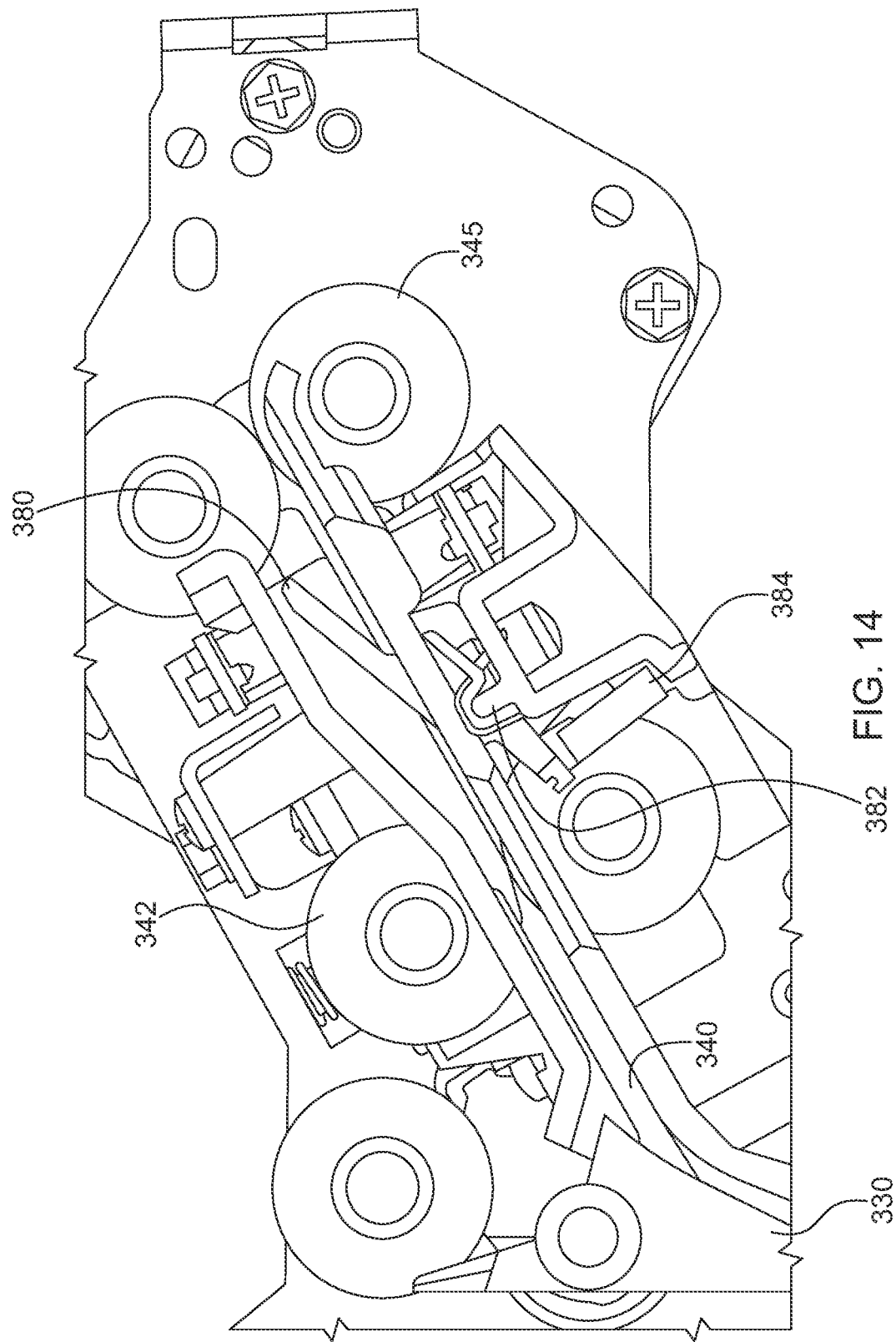
FIG. 14 is an enlarged fragmentary side elevational view of a portion of the sorter illustrated in FIG. 9.

Referring now to FIGS. 13-14, the system may optionally incorporate one or more elements to corrugate the documents to facilitate stacking of the documents in the sort bins 400-408. Corrugating the documents as they are discharged into the bin may tend to improve the stacking of the documents.

Referring to FIG. 13, the discharge nip 345 includes a plurality of upper rollers 348 mounted on an axle 349. Upper rollers 348 are spaced apart from one another along the length of the axle so that the rollers extend across the width of the document path. Similarly, the discharge nip further includes a plurality of lower rollers 346 on an axle 347. Lower rollers 346 are spaced apart from one another along the length of the axle so that the rollers extend across the width of the document path. In the present instance, the lower rollers 346 are driven rollers and the upper rollers 348 are idler rollers. Specifically, axle 347 may be directly connected with one of the sort path motors 360-368.

As shown in FIG. 13, a plurality of corrugation elements 380 may be positioned in the gaps between the upper and lower rollers 346, 348 along the length of the axles 347, 349. The corrugating elements 380 project upwardly above the upper surface of the lower rollers 346. In this way, the corrugating elements 380 push the document 20 upwardly while the nip 345 holds portions of the document at a lower plane. In this way, the corrugating elements 380 tend to create corrugations in the document 20 as the document is discharged through the discharge nip 345.

In the present instance, the corrugating elements 380 provide a variable corrugating force. In particular, the height that the corrugating element projects upwardly relative to the paper path varies. For example, the height that the corrugating element projects upwardly may vary based on the thickness of the document. More specifically, optionally the distance that the corrugating elements project upwardly relative to the paper path is inversely proportional to the thickness of the document.

Referring to FIG. 14, the corrugating element may be an elongated finger 380 that projects upwardly at an angle with the paper path. The finger 380 may be a pivotable lever that pivots about a pivot point 382. The finger may be biased upwardly. In particular, the rear end of finger 380 may be connected with a biasing element 384 that biases the rearward end of the finger downwardly, which in turn tends to bias the upper end of the finger upwardly. As a document is driven over the finger 380, the finger pushes the paper upwardly to corrugate the paper. The document pushes down on the finger urging the finger downwardly against the biasing force of the spring. The amount of force applied by the document onto the finger increases as the thickness of the document increases. In this way, the corrugating element projects upwardly less for thick documents than for thin documents. Accordingly, the height of the corrugations is variable depending on the thickness of the document so that thicker documents have shallower corrugations than thinner documents.

Method of Use

The workstation 10 and sorting station 100 may be utilized to process a variety of documents using a variety of document workflows. The workstation 10 and the sorting station combine to provide alternate workflows that can be utilized for different batches of documents. For instance, a first batch of documents may be a stack of documents in the form of contents that have been extracted from envelopes. For such a job, the operator may input information to the system indicating that the documents for that job are to be scanned by the scanner 60 and sorted to the output bins 70.

It should be understood that the image processor 90 for the system is operable to process the image data acquired for a document by the scanner 60. In particular, the image processor is operable to process the data to identify and read markings on the document. For instance, the image processor 90 may utilize OCR to identify text, such as the recipient's address printed on the document. Similarly, the image processor may identify and read markings such as a bar code. The identification marking can then be used to control the processing of the document in the sorting station 300 as discussed above.

Optionally, the sorting station may be operated in a manner that promotes orderly stacking of the documents in the sort bins 400-408. For example, the vertical path 310 may operate at a set speed. An exemplary speed of 50-70 in/sec (or 125-175 cm/sec) may be used. In particular, the track speed may be approximately 60 in/sec (or 150 cm/sec). However, it may be desirable to discharge the documents at a significantly lower track speed so that the documents are gently discharged into the sort bins to form an orderly stack. An exemplary low track speed for discharging the documents may be approximately 15-30 in/sec (or 35-75 cm/sec). In particular, the discharge speed may be approximately 20 in/sec (or 50 cm/sec).

Slowing down the documents at discharge may create upstream difficulties with the trailing documents. In particular, the upstream documents may tend to jam when the track is slowed down to discharge a document. Accordingly, it may be desirable to create separation between a document being discharged and the trailing document. To provide separation, prior to discharging a document, the sort path speed may be significantly increased before the document is subsequently slowed at discharge. For example, the document may be sped up to approximately 120-150 in/sec (or 300-375 cm/sec). An exemplary high speed is 135 in/sec (or 340 cm/sec).

In an exemplary methodology, a document is conveyed along the vertical transport at a first speed (e.g., 60 in/sec). The document is directed into one of the sort paths; for instance, a gate may selectively divert a document into a first sort path. In the sort path, the document path speed may be increased to a second speed (e.g., 135 in/sec) for a certain time or until the document has traveled a certain distance. Prior to the trailing edge of the document entering the discharge nip, the document path speed may be reduced to a third speed that is less than the first and second speeds (e.g., 20 in/sec). After the trailing edge of the document passes through the discharge nip 345, the document path speed may be increased to the first document path speed so that the document path speed of the sort path matches the document path speed of the vertical path.

More specifically, the vertical path 310 and the entry nip of the sort path may operate at a relatively constant speed while the speed of the discharge nip may vary depending on the position of the document to be sorted. For instance, the document may be conveyed at the track speed (e.g., 60 in/sec) as the document is transported by the vertical path and the entry nip. The document continues at the track speed until the document engages the discharge nip. As the document enters the discharge nip, the motor 360 increases the speed of the discharge nip rollers 345 (e.g., 135 in/sec) so that the discharge rollers pull the document through the discharge nip to increase the speed of the document relative to a trailing document that is in the vertical path thereby increasing the gap between the document and the trailing document. The discharge nip 345 operates at the increased speed until most of the document has passed through the discharge nip. The motor 360 then slows significantly (e.g., 20 in/sec) so that the trailing end of the document is driven through the discharge nip at the low speed. In this way, the document is discharged at a low speed to provide an orderly stack of documents in the sort bin 400. The motor 360 is sped back up to drive the discharge nip at track speed (e.g., 60 in/sec).

The timing of the speed changes may be controlled based on one or more of the sensors 325, 350 that detect the presence of the documents. For example, the sensor 325 in the vertical path that immediately precedes the sort path to which a document is directed may be used to control the speed of the document transport. For instance, the document may be driven at a first speed (e.g., 60 in/sec as the document is driven along the document path and into the sort path. After the document passes the sensor 325 adjacent the sort path, the sensor detects the trailing edge of the document. The detection of the trailing edge of the document starts a timer for controlling the speed of the discharge nip 345. In particular, once the trailing edge of the document is detected, the discharge nip speed is increased to an increased speed (e.g., 120 in/sec) at a certain pre-determined time corresponding to the time it takes the leading edge of the document to travel from the sensor to the discharge nip when travelling at the transport speed. The discharge nip is driven at the increased speed for a predetermined time period. In particular, the predetermined time period may be the amount of time it takes for the trailing edge to travel to a predetermined point upstream from the discharge nip. For instance, the time that it takes the trailing edge to travel from the sensor 325 to an inch in front of the discharge nip. After the predetermined time period, the motor 360 is slowed to a slow speed (e.g., 20 in/sec) for a time period sufficient for the document to pass through the discharge nip and be discharged into the bin 400. After this time period, the speed of the discharge nip is increased to the transport speed.

It will be recognized by those skilled in the art that changes or modifications may be made to the above-described embodiments without departing from the broad inventive concepts of the invention. It should therefore be understood that this invention is not limited to the particular embodiments described herein but is intended to include all changes and modifications that are within the scope and spirit of the invention as set forth in the claims.

The invention claimed is:

1. An apparatus for processing documents, comprising:
   a feeder configured to feed a plurality of documents one at the time wherein the feeder is configured to singulate the documents to serially feed the documents forwardly toward a document transport; and
   a sorter configured to sort the documents into one or more output bins, comprising a document transport configured to convey the documents at a first speed and a discharge transport configured to convey the documents away from the document transport and toward a first bin of the one or more output bins and to selectively increase the speed of the documents to a second speed and then decrease the speed of the documents to a third speed that is lower than the first or second speeds, wherein the discharge transport relays the documents to the first bin of the one or more output bins at the third speed.

2. The apparatus of claim 1 comprising a scanner for scanning the documents to obtain image data for each document wherein the feeder is configured to feed the documents to the scanner.

3. The apparatus of claim 2 comprising a conveyor for conveying the documents toward the feeder, wherein the conveyor is configured to convey the documents in a generally horizontal orientation with a face of the document facing upwardly.

4. The apparatus of claim 1 comprising a sensor configured to detect the leading edge of the documents along the document transport or the discharge transport wherein the discharge transport increases speed to the second speed or decreases the speed to the third speed in response to signals from the sensor.

5. The apparatus of claim 1 wherein the discharge transport comprises a discharge nip comprising opposing roller configured to engage the documents.

6. The apparatus of claim 5 comprising a first motor connected with the document transport to drive the document transport and a second motor connected with a roller of the discharge nip to drive the discharge nip.

7. The apparatus of claim 5 wherein the discharge nip is configured to pull one of the documents out of the document transport when the discharge speed is increased to the second speed.

8. The apparatus of claim 1 wherein the sorter comprises a plurality of output bins and a plurality of discharge transports wherein each discharge transport leads to a corresponding one of the output bins.

9. The apparatus of claim 8 wherein each discharge transport comprises a separate independently operable motor.

10. The apparatus of claim 9 comprising a controller operable to selectively control the speed of each of the discharge transport motors to selectively increase the speed of the corresponding discharge transport to the second speed.

11. The apparatus of claim 9 comprising a controller operable to selectively control the speed of each of the discharge transport motors to selectively decrease the speed of the corresponding discharge transport to the third speed.

12. The apparatus of claim 8 comprising a plurality of gates for selectively directing the documents from the document transport to one of the discharge transports.

13. The apparatus of claim 1 comprising a sensor for detecting the presence of the documents.

14. The apparatus of claim 13 comprising a controller configured to control the discharge transport to increase the speed to the second speed in response to signals from the sensor.

15. The apparatus of claim 14 wherein the signals from the sensor are indicative of the leading edge of one of the documents passing the sensor.

16. The apparatus of claim 14 wherein the controller is configured to control the discharge transport to decrease the speed to the third speed in response to signals from the sensor.

17. The apparatus of claim 16 wherein the signals from the sensor are indicative of the trailing edge of one of the documents passing the sensor.

18. The apparatus of claim 14 wherein the controller is configured to control the discharge transport to increase the speed from the third speed to the first speed in response to signals from the sensor.

* * * * *